(12) United States Patent
Zhuk

(10) Patent No.: US 10,850,578 B2
(45) Date of Patent: Dec. 1, 2020

(54) WHEEL SENSOR

(71) Applicant: Melexis Technologies SA, Bevaix (CH)

(72) Inventor: Oleksandr Zhuk, Vaumarcus (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 268 days.

(21) Appl. No.: 15/902,099

(22) Filed: Feb. 22, 2018

(65) Prior Publication Data

US 2018/0244116 A1 Aug. 30, 2018

(30) Foreign Application Priority Data

Feb. 24, 2017 (EP) .................................. 17157858

(51) Int. Cl.
  *B60C 23/04* (2006.01)
  *G01L 17/00* (2006.01)
  *G01P 15/08* (2006.01)

(52) U.S. Cl.
  CPC ...... *B60C 23/0488* (2013.01); *B60C 23/0416* (2013.01); *B60C 23/0459* (2013.01); *B60C 23/0483* (2013.01); *B60C 23/0489* (2013.01); *G01L 17/00* (2013.01); *G01P 15/0802* (2013.01)

(58) Field of Classification Search
  CPC ............ B60C 23/0488; B60C 23/0416; B60C 23/0459; B60C 23/0483; B60C 23/0489; G01L 17/00; G01P 15/0803
  See application file for complete search history.

(56) References Cited

U.S. PATENT DOCUMENTS

| 8,700,286 B2 | 4/2014 | Steiner et al. |
| 2003/0038716 A1 | 2/2003 | Piesinger |
| 2012/0200408 A1 | 8/2012 | Gotschlich et al. |
| 2013/0166140 A1* | 6/2013 | Steiner ................ B60C 23/0459 701/34.4 |
| 2014/0200785 A1 | 7/2014 | Steiner et al. |

FOREIGN PATENT DOCUMENTS

| EP | 2415618 A1 | 2/2012 |
| EP | 2450202 A1 | 5/2012 |

OTHER PUBLICATIONS

Brown, Double (D-EMA) and Triple Exponential Moving Average (T-EMA), Nov. 17, 2010 (Year: 2010).*
Extended European Search Report from EP Application No. EP 17 15 7858, dated Jul. 18, 2017.

* cited by examiner

*Primary Examiner* — Matthew G Marini
(74) *Attorney, Agent, or Firm* — Workman Nydegger

(57) ABSTRACT

A method of measuring and transmitting a tire characteristic using a sensor device mounted to a tire of a wheel, the sensor device comprising a sensor element, an accelerometer, a wireless transmitter, and a microprocessor; the method comprising the steps of: a) obtaining acceleration data; b) digitally filtering the acceleration data; c) determining moments in time when the wheel is in an angular position range; d) obtaining other sensor data; e) transmitting the other sensor data at said moments in time, step b) comprising using exponential moving average filters connected in series, corresponding to a predefined set of formulas comprising parameters, and f) determining number of samples per 360° rotation, and setting the parameters to a value proportional to said number of samples. A sensor device adapted for performing said method.

16 Claims, 10 Drawing Sheets

$$EMA[1]_i = \frac{1}{N} x_i + \frac{N-1}{N} EMA[1]_{i-1}$$

$$EMA[M]_i = \frac{1}{N} EMA[M-1]_i + \frac{N-1}{N} EMA[M]_{i-1}$$

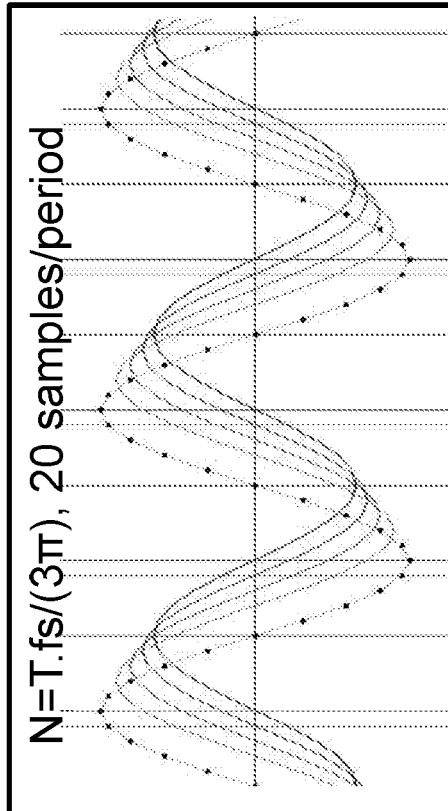
FIG. 12(a)
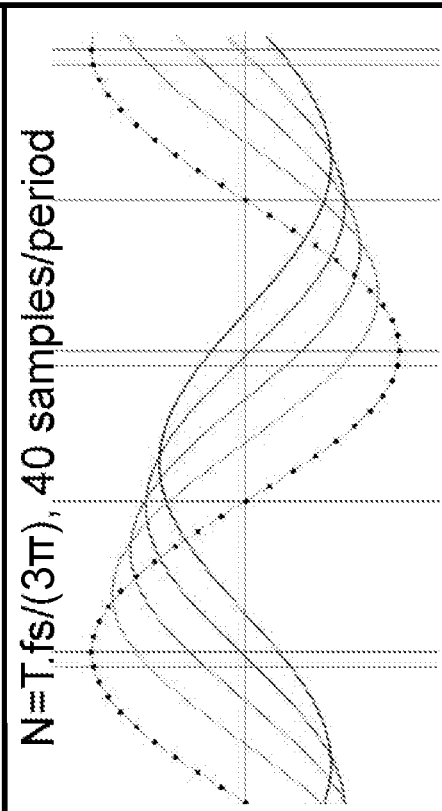
FIG. 12(c)
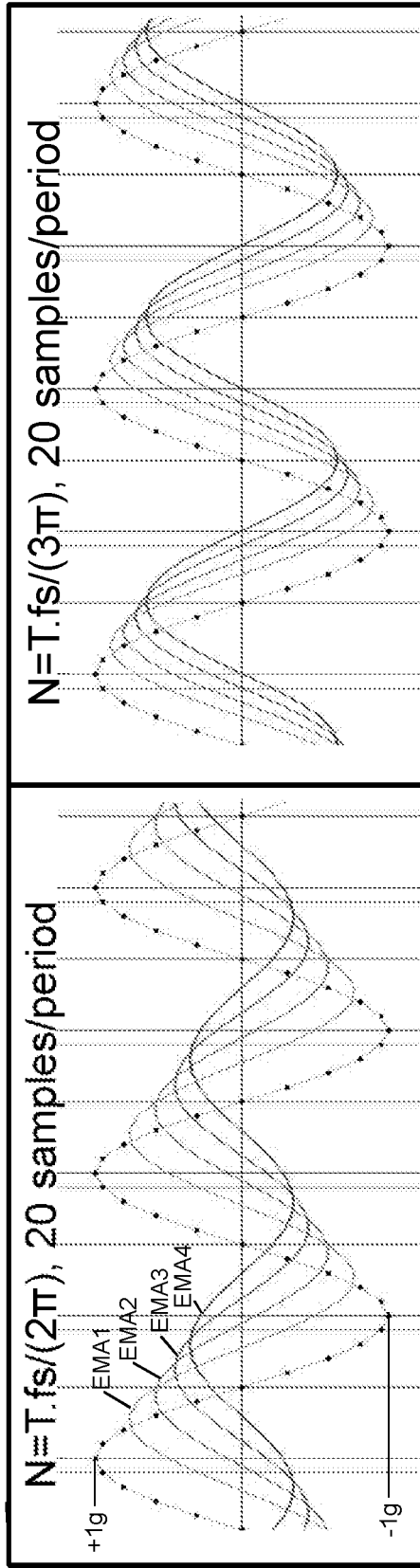
FIG. 12(b)
FIG. 12(d)

WHEEL SENSOR

FIELD OF THE INVENTION

The present invention generally relates to sensor devices mountable to a wheel of a vehicle, such as for example tire pressure sensor devices as may be used in tire pressure monitoring systems (TPMS) and/or in systems for localizing individual tires on a vehicle, but sensor devices of the present invention do not necessarily require a pressure sensor, but may include another kind of sensor, for example a temperature sensor instead, or in combination with the pressure sensor.

BACKGROUND OF THE INVENTION

Systems for detecting "tire pressure" are known in the art. They typically come in two flavours:

(a) the so called "indirect system", in which no pressure sensor is mounted to each wheel, but pressure of one of the tires is determined indirectly, based for example on the average number of turns of each of the wheels over a large distance;

(b) the so called "direct system", in which a sensor device comprising a pressure sensor and a wireless transmitter is mounted to each wheel, and is adapted for measuring a pressure of the tire, and for transmitting the pressure to a control unit of the vehicle.

The present invention is more closely related to the "direct system".

In order to be able to inform the driver of the vehicle not only that "one" of the tires has low pressure, but "the front left tire" has low pressure, it is not sufficient to know that the wheel with a unique sensor ID (e.g. 123 as an example) has low pressure, but a control unit of the car needs to know on which wheel this sensor is actually located, e.g. at the "front left" side of the car.

While it would be technically possible to associate the position of each wheel (e.g. front left, front right, rear left, rear right) by manually entering a unique ID in a controller of the vehicle (e.g. a board computer), a problem occurs when wheels are replaced, for example between seasons.

Such manual association can be avoided by using "auto-location". Some auto-location systems use TPMS sensor devices not only comprising a pressure sensor and a unique ID, but also comprising an accelerometer capable of detecting a +/−1 g signal ripple of the centrifugal (or centripetal) acceleration signal, and by correlating this ripple signal with the signals obtained from an ABS-system, because the position of each ABS-device relative to the car is fixed. Examples of auto-location by correlating acceleration data originating from TPMS devices mounted on the wheels with ABS data are known in the art, and hence need not be explained in more detail here.

TPMS devices are typically battery powered, and it is a major challenge to meet low power consumption such that a single battery is capable of operating the TPMS device (mounted on the wheel) for a period of e.g. 10 years, while being capable of measuring the tire pressure and transmitting acceleration related data (during a certain time-window after the car is moving) for allowing auto-localization. At present, two solutions are provided:

(b1) TPMS devices that measure pressure data and measure acceleration data, and that transmit this data (during said time-window) in one or more data packets, for further processing by the control unit (for example performing said correlation between ABS data and TMPS acceleration data). These devices have the disadvantage that a sufficient amount of acceleration data needs to be transmitted, but have the advantage that the devices do not need to actually process the data (apart from packaging or wrapping the data in a data packet, optionally providing a time-stamp, and the like). Such a system is for example described in US2014200785 (A1).

(b2) TPMS devices that measure pressure data and measure acceleration data, and that process the acceleration data internally for determining a suitable moment to transmit the sensor data (e.g. pressure value, but not necessarily including the acceleration data). Such TPMS devices typically transmit the sensor data once each per wheel rotation, when the wheel is at a predefined angular position. Such as system is for example referred to by US2014200785(A1) column 5, third paragraph. These devices have the disadvantage that more data processing needs to be done internally, but have the advantage that the devices can transmit less data.

The devices of category (b1) and category (b2) make a different trade-off to save power. In the devices of category (b1), power consumption related to data processing is reduced, but power consumption related to data transmission is increased. In the devices of category (b2), power consumption related to data transmission is reduced, but power consumption related to data processing is increased.

The present invention is more closely related to sensor devices of the category (b2) described above. Such devices typically transmit a data package containing an ID and a sensor value (e.g. pressure value) only once per wheel rotation, but preferably each time when the wheel is in a particular angular position.

US2003038716(A1) describes a solution of a "direct TPMS sensor combined with an ABS".

US2012200408(A1) describes a solution to localize tires, based on a localization scheme that reconstructs a +/−1 g ripple with waveform, amplitude, frequency and phase parameters. Because the waveform is known to be sinusoidal (due to the wheel rotation), the amplitude is known to be 2 g peak-to-peak (due to the gravitational +/−1 g), the frequency depends on vehicle speed (which can be estimated from centrifugal force measurements), and an algorithm is discussed herein for determining the phase by correlation, the +/−1 g ripple can be reconstructed and the wheels localized therefrom.

U.S. Pat. No. 8,700,286(B2) also describes tire localization systems, and methods in tire pressure monitoring systems.

There is a need to provide a method (or algorithm) for determining an angular wheel position that can be performed by such sensor devices, as a prerequisite for allowing the sensor data to be transmitted in synchronism with the wheel rotation, e.g. each time when the wheel is in a predetermined angular position.

SUMMARY OF THE INVENTION

It is an object of the present invention to provide a sensor device mountable to a wheel and to provide a method to be performed by said sensor device, for detecting an angular position of the wheel when the wheel is rotating.

In particular, it is an object of the present invention to provide such a sensor device and method that is sufficiently accurate, and/or does not require a significant amount of power, and/or is robust, and preferably all of these.

It is an object of particular embodiments of the present invention to provide a method that can be performed by a low-power microcontroller embedded in such a sensor device, that is robust against signal distortions due to mechanical vibrations, and that is power-efficient.

It is an object of particular embodiments of the present invention to provide a pressure sensor device and a method for measuring a tire pressure and for transmitting the measured tire pressure at moments when the wheel is in a predefined angular range.

It is an object of particular embodiments of the present invention to provide a tire-location system comprising such pressure sensor devices and an ABS system.

These and other objectives are accomplished by a method and circuit according to embodiments of the present invention.

In a first aspect, the present invention provides a method of measuring and transmitting a tire characteristic using a sensor device mounted or mountable to a tire of a wheel of a vehicle, the sensor device comprising: at least one sensor element for sensing a characteristic of the tire, an accelerometer, a wireless transmitter or transceiver, and a controller; the method comprising the steps of: a) obtaining information from an acceleration sensor at a sampling frequency, and digitizing said information, thereby obtaining acceleration data; b) digitally filtering the acceleration data to reduce noise; c) determining at least two moments in time at which the wheel is in a constant angular position range; d) obtaining and digitizing sensor information from at least one other sensor adapted for measuring a characteristic of the tire, thereby obtaining other sensor data; e) transmitting the other sensor data to a receiver at said moments in time; wherein step b) comprises making use of a plurality of at least two digital filters connected in series, each of the at least two digital filters being an exponential moving average filter having a filter characteristic corresponding to a set of predefined formulas comprising one or more parameters; and wherein the method further comprises step f) of determining the number of samples between said moments in time, and setting each of said parameters to a value proportional to said number of samples.

The "constant angular position range" preferably has a tolerance margin less than +/−20°, preferably less than +/−15°, preferably less than +/−10°. The value of the constant is not important for the present invention, as long as it is constant. For example, the invention will work if the transmission takes place each time the sensor device is at the top of the wheel, or at the bottom of the wheel, but will also work if the wheel is in any other position, as long as transmissions take place when the wheel is always in this particular position. Instead of "wheel orientation", the expression "angular position of the wheel" can also be used.

In contrast to "curve fitting" or other minimization techniques, which are techniques that require a powerful processor and consume a lot of time and energy, and therefore need to be done outside of the sensor device, the inventors have found that it is possible to obtain a very stable angle (robust against noise) by using said digital filtering techniques, based on at least two EMA's.

It is a major advantage of using at least two and preferably less than seven EMA-filters connected in series, inter alia because such a filter can be implemented on a relatively simple processor, and requires only a limited number of operations (e.g. in the order of only two multiplications and one addition per additional sample), and requires only very limited memory resources. This is advantageous in terms of silicon area (thus chip cost) as well as power consumption (lifetime of battery powered application).

It is an advantage that a series of EMA-filters, when provided with noisy data at the input, can effectively be used for filtering the mechanical noise encountered in this kind of application.

It is a major advantage of such a filter that it provides a substantially constant phase shift, which is largely insensitive to the frequency at which the acceleration sensor is sampled.

The combination of these features make the filter as proposed herein ideal for the envisioned application.

In an embodiment, the sampling frequency is chosen as a function of an angular speed of the wheel such that the number of samples per wheel rotation is a value in the range from 20 to 100, preferably in the range from 40 to 80.

In an embodiment, the sampling frequency is increased when the number of samples per wheel rotation (e.g. the number of samples of the most recent wheel rotation) is found to be lower than a predefined threshold (e.g. lower than 30), and the sampling frequency is decreased when the number of samples per wheel rotation (e.g. the number of samples of the most recent wheel rotation) is found to be higher than a predefined threshold (e.g. higher than 70). The sampling frequency can for example be selected from a limited list of predefined sampling frequencies, for example from a list containing less than 10, e.g. less than 8, e.g. less than 6, e.g. only five or only four or only three predefined sampling frequencies.

In an embodiment, step f) comprises: setting the parameter of the first exponential moving average filter to a value equal to said number of samples between said moments in time divided by a predefined first constant in the range from 5.0 to 12.0; and setting the parameter of the second exponential moving average filter to a value equal to said number of samples between said moments in time divided by a predefined second constant in the range from 5.0 to 12.0.

The value of the first and second constant may be the same, or may be different values.

In an embodiment, step f) comprises: setting the parameter of the first exponential moving average filter to a value equal to said number of samples multiplied by a predefined first constant in the range from $\frac{1}{12}$ to $\frac{1}{5}$; and setting the parameter of the second exponential moving average filter to a value equal to said number of samples multiplied by a predefined second constant in the range from $\frac{1}{12}$ to $\frac{1}{5}$.

The value of the first and second constant may be the same, or may be different values.

In an embodiment, step a) comprises readout of a centrifugal or centripetal acceleration sensor; and step b) comprises determining an average value; and step c) comprises selecting said moments in time as the moments at which an output of one of the EMA-filters crosses said average value or crosses a value equal to said average value plus a predefined constant offset, the predefined constant offset being a value in the range from −0.4 g to +0.4 g, or in the range from −0.3 g to +0.3 g, or in the range from −0.2 g to +0.2 g.

The average value can for example be determined as the average of the most recent local maximum value of a particular EMA, (e.g. the most recent local maximum of EMA3) and the most recent local minimum value of the same EMA.

With a "centrifugal acceleration sensor" is meant an acceleration sensor configured for determining an acceleration in a radial direction, related to centrifugal force.

In an embodiment, step a) comprises readout of a tangential acceleration sensor; and step c) comprises selecting said moments in time as the moments at which an output of one of the EMA-filters crosses zero, or crosses a value equal to zero plus a predefined constant offset, the predefined constant offset being a value in the range from −0.4 g to +0.4 g, or in the range from −0.3 g to +0.3 g, or in the range from −0.2 g to +0.2 g.

With a "tangential acceleration sensor" is meant an acceleration sensor configured for determining an acceleration in a tangential direction, e.g. tangential to the circumference of the tire.

In an embodiment, step c) comprises selecting said moments in time as the moments at which an output of one of the EMA-filters crosses an output of another EMA filter.

With "crosses" is meant that a difference between the first output value and the second output value (v1-v2) changes sign before and after said moment in time.

As an example only, the crossings of EMA1 and EMA2, or the crossings of EMA1 and EMA3, or the crossings of EMA1 and EMA4, etc., or the crossings of EMA2 and EMA3, or the crossings of EMA2 and EMA4, or the crossings of EMA2 and EMA5, etc.

In an embodiment, step c) comprises selecting said moments in time as the moments at which an output of a first EMA-filter crosses an output of another EMA filter which is not directly following the first EMA filter.

In these embodiments, the crossings of EMA2 and EMA3 are not allowed, but the crossings of EMA2 with for example EMA3 or EMA4 is a good candidate.

It was found that for values of C in the range from about 5.0 to about 12.0, that the phase shift is a value in the range from about 30° to about 45°, hence, the signals at the outputs of the two EMA's are phase shifted by an angle in the range from about 60° to about 90°, which is beneficial in that the slopes of the two curves are substantially different from each other, hence, the moment of crossing is highly insensitive to noise.

In an embodiment, the digital filter comprises six EMA-filters connected in series, and the parameter "N" of each of these EMA-filters is set equal to the value T.fs/(2*π), where T is the period of one 360° rotation, and fs is the sampling frequency.

Or stated in other words, the parameter N of each filter is set to the number of samples per 360° wheel rotation, divided by 2*π.

In an embodiment, step a) comprises obtaining acceleration information in a single axis.

The single axis may be a radial direction, in which case the acceleration data corresponds to centrifugal or centripetal force, or the single axis may be oriented in a tangential direction, in which case the acceleration data corresponds to tangential acceleration. Interestingly, both of these have a +1 g/−1 g ripple signal due to gravity force, but (assuming the vehicle is driving at constant speed) the tangential acceleration does not have a DC value.

When available, the DC value can be used to calculate an angular speed of the wheel in manners known per se in the art. But the angular speed can also be calculated or estimated based on a measurement of the time required for one complete 360° rotation of the wheel.

In an embodiment, step a) comprises obtaining acceleration information in at least two axes, which are not parallel to each other.

In this embodiment, the radial acceleration can be used to determine or estimate the angular speed (taking into account the radius of the wheel, which can e.g. be stored in a non-volatile memory), and the second axis can for example be tangential to the wheel. The latter acceleration sensor provides a +1 g/−1 g signal without DC-value, which is preferred.

In an embodiment, the sensor device further comprises a sleep mode or lower power mode and a wake-up timer, and the sensor device comprises a microprocessor adapted, e.g. programmed for going to sleep mode for at least 80% of the time.

In an embodiment, the other sensor element is a temperature sensor or a pressure sensor.

In an embodiment, the sensor device comprises both a temperature sensor and a pressure sensor.

In an embodiment, the predefined set of formulas comprising the one or more parameter is the following set of formulas, or an equivalent set of formulas, the formula for the first EMA-filter being the following formula, or an equivalent formula:

$$EMA[1]_i = \frac{1}{N1}x_i + \frac{N1-1}{N1}EMA[1]_{i-1},$$

wherein $x_i$ is a sample of the digitized acceleration data, $EMA[1]_i$ is the "i"-th value of the first Exponential Moving Average filter, "i" is an index which is incremented by one for each additional data sample, N1 is a floating point number equal to the number of samples per period divided by C1, C1 being a predefined constant in the range from 5.0 to 12.0;

and the predefined formula for the second EMA-filter being the following formula, or an equivalent formula:

$$EMA[2]_i = \frac{1}{N2}EMA[1]_i + \frac{N2-1}{N2}EMA[2]_{i-1},$$

wherein N2 is a floating point number equal to said number of samples divided by C2, C2 being a predefined constant in the range from 5.0 to 12.0.

It is noted that $N_1$ is a floating point value, not necessarily an integer. It is noted also that the value of $N_1$ and $N_2$ need not be the same, but can be different.

In case of more than two EMA's, the formula for the third (M=3) and each subsequent EMA-filter can be written as:

$$EMA[M]_i = \frac{1}{Nm}EMA[M-1]_i + \frac{Nm-1}{Nm}EMA[M]_{i-1},$$

where $N_m$ is the value of N for the M-th EMA-filter, and is equal to said number of samples per 360° wheel rotation divided by $C_m$, $C_m$ being a constant value in the range from 5.0 to 12.0.

In a second aspect, the present invention provides a sensor device for measuring and transmitting at least one tire characteristic, the sensor device being mountable to a tire of a wheel of a vehicle, and comprising: an acceleration sensor; another sensor element for sensing a characteristic of the tire; a wireless transmitter or transceiver; a timer; a controller configured, e.g. programmed for performing the method according to the first aspect.

The sensor device may be an integrated semiconductor device.

The controller may comprise a programmable microprocessor comprising or connected to memory, or may comprise a digital state-machine.

In a third aspect, the present invention provides a sensor module comprising: a sensor device according to the second aspect; and a battery or energy harvesting means for powering the sensor device.

The energy harvesting means may for example be inductive, or piezo-electric energy harvesting means.

In a fourth aspect, the present invention provides a tire localization system comprising a plurality of sensor devices according to the third aspect.

The tire localization system may further comprise a plurality of wheels, each wheel comprising a sensor device according to the first aspect, the vehicle further comprising a control unit comprising a receiver for receiving the sensor data transmitted by each of the sensor devices, and a time capture unit adapted for providing a time stamp corresponding to the time of reception of the sensor data, the vehicle further comprising an ABS system adapted for providing wheel rotation data, the control unit being operatively connected to the ABS system and being adapted for finding a correspondence between the wheel rotation data provided by the ABS system and the sensor data provided by the sensor devices mounted to the wheels, thereby localizing each wheel.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 2 also shows a "sinusoidal curve" as can be obtained for example by "curve fitting" techniques performed on a powerful computer.

FIG. 3 also shows a set of mathematical formulas corresponding to the filters.

FIGS. 12(a) to 12(d) show four exemplary sets of curves as can be obtained from a sensor device comprising an accelerometer and the filter structure of FIG. 3, when using a particular weighting factor N and sampling speed.

FIG. 12(a) represents a set of curves for $N=T.fs/(2\pi)$ and 20 samples/period, FIG. 12(b) represents a set of curves for $N=T.fs/(2\pi)$ and 40 samples/period, FIG. 12(c) represents a set of curves for $N=T.fs/(3\pi)$ and 20 samples/period, FIG. 12(d) represents a set of curves for $N=T.fs/(3\pi)$ and 40 samples/period.

DETAILED DESCRIPTION OF ILLUSTRATIVE EMBODIMENTS

Figure 1:
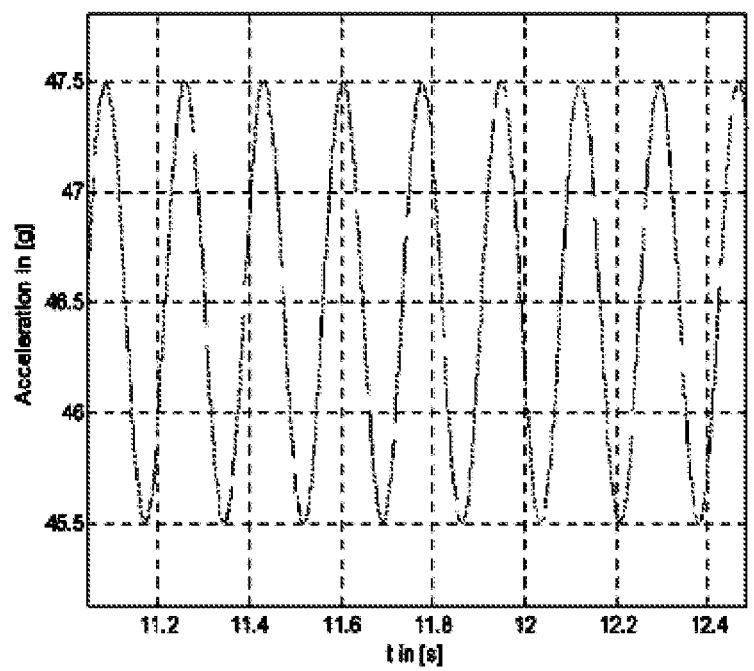
FIG. 1 (replica of FIG. 3 of U.S. Pat. No. 8,700,286B2) shows an example of (ideal) acceleration data versus time as would be measured by an acceleration sensor of a sensor device in the absence of noise.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates generally to systems comprising at least one sensor device mounted or mountable to a wheel of a vehicle, the sensor device being adapted for measuring at least one characteristic (e.g. a tire characteristic such as tire pressure or tire temperature, or a wheel characteristic or an environmental characteristic or any other characteristic).

Methods and devices according to the present invention can be used for example in a "direct TPMS" system, and/or in automatic wheel location systems, but the present invention is not limited thereto, and can also be used for other applications. For ease of the description however, the invention will be described in more detail for the specific case of a tire pressure monitoring system (TPMS) system.

The main function of a TPMS system (as the name suggests) is to frequently monitor the tire pressure (e.g. multiple times per second), and to conditionally transmit the measured tire pressure to a receiver, e.g. to a board computer of a vehicle. The pressure can be transmitted for example immediately after an anomaly is detected, or e.g. once every 2 minutes when the wheel is rotating but the pressure is normal (read: lies within a predefined range), but other schemes can also be used. When the wheel is not rotating, e.g. when the wheeled vehicle is parked, the sensor device typically does not transmit in order to save power.

Another function, nowadays typically also implemented in TPMS systems, is that of "auto-location", referring to a mechanism that automatically detects for example four sensor devices, one for each of the wheels of a car, which system is also capable of detecting which sensor device is located where, for example front-left, front-right, rear-left or rear-right. This is possible for example by not only incorporating a pressure sensor in the sensor device, but also an acceleration sensor, and by correlating acceleration data with for example ABS data. Techniques and methods for finding such correlation are known and described in the prior art, for example in the documents cited in the background section, and therefore need not be described in detail here.

A system with "auto-location" allows for example to inform the driver of the vehicle not only that the pressure of one of the tires is low, but allows to explicitly inform the driver which of the tires has a low pressure, for example the tire of the left-rear wheel.

The main challenge of direct TPMS systems is related to "power budget", because the sensor devices are typically battery powered and should be able to operate for a relatively long period (e.g. at least 10 years under certain use case conditions, depending on the customer requirements). This implies that some trade-offs need to be made to save power. A typical battery used for this kind of applications is a coin cell battery or a button cell battery, e.g. a Lithium coin cell battery according to IEC CR2032 having a typical capacity of about 225 mAh, but the present invention is not limited thereto, and other battery types can also be used.

As already described in the background section (when discussing US2014200785), there are two fundamentally different approaches used in "direct systems":

(b1) a first approach were a lot of acceleration data is captured and transmitted to a control unit of the car as individual data packages, or combined in a single data package accompanied with time stamps, which control unit correlates the time-stamped acceleration data with time-stamped ABS-data. The power-limited sensor device does not have to process the acceleration data content, but only needs to package (and optionally time-stamp) and transmit the acceleration data. The control unit is powered by the car battery, and does not suffer from the same power-limitations. It can be understood that the outcome of the correlation depends mainly on the accuracy of the time-stamps, but not on the moment of transmission.

(b2) a second approach (mentioned in US2014200785 column 5, third paragraph) where a data packet (e.g. containing a device ID and optionally a sensor value, e.g. a pressure value) is transmitted only once per wheel rotation, and in synchronism with the wheel rotation, i.e. always at substantially the same angular position of the wheel. The control unit of the car typically time-stamps the data packet upon its arrival, and correlates the acceleration data and the ABS data, to find the most likely wheel position. It can be understood that the outcome of the correlation in this case depends heavily on the accuracy of moment of transmission, which is one of the problems underlying the present invention.

It is a major challenge to find a robust and a sufficiently accurate mechanism that can be implemented on the resource-constraint (e.g. memory-constraint, performance constraint) and power-constraint processor.

With "sufficiently accurate" is meant for example that the time of transmission occurs when an angular position of the wheel is in a predefined angular range of about +/−15°, or about +/−10°.

With "robust" is meant that the time of transmission does not suffer significantly from noise, in particular random noise imposed on the acceleration data caused by mechanical vibrations of the rotation wheel in contact with the road.

Figure 3:
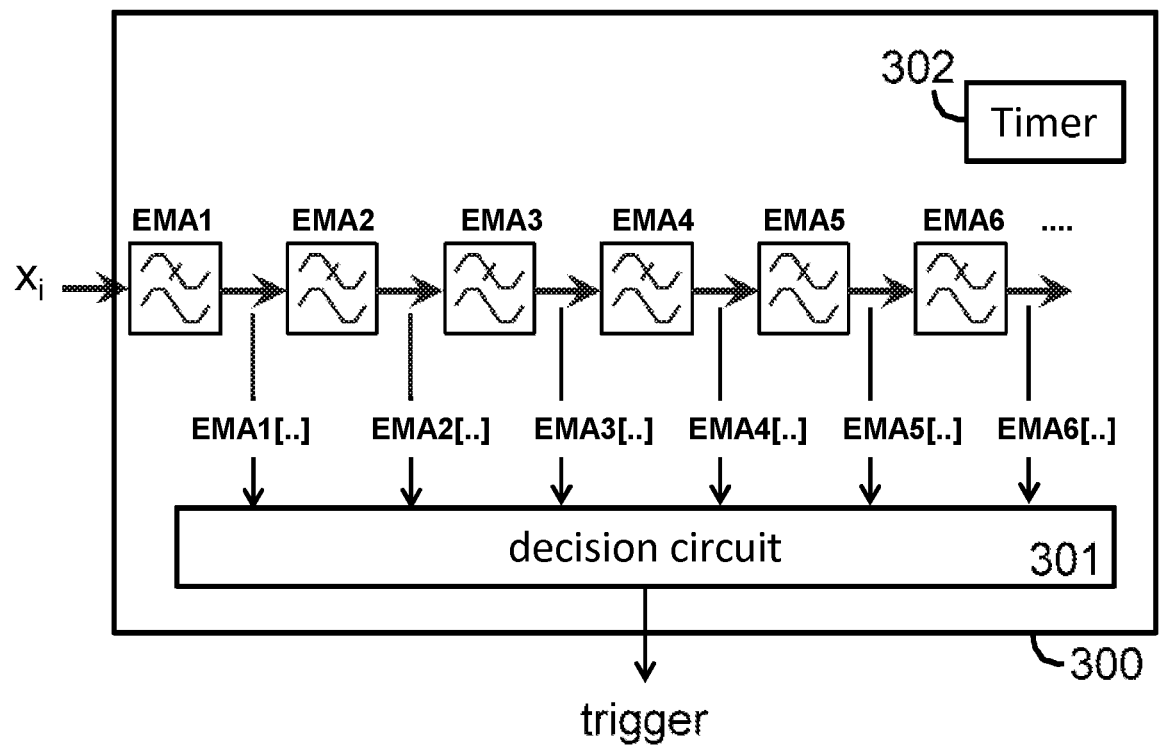
FIG. 3 shows six low-pass filters connected in series, as can be used in embodiments of the present invention, each filter being an "Exponential Moving Average" (EMA) Filter.

FIG. 1 is a replica of FIG. 3 of U.S. Pat. No. 8,700,286B2, and shows an example of (ideal) acceleration data versus time as would be measured by an acceleration sensor of a sensor device mounted to the wheel, in the absence of noise. It is noted that U.S. Pat. No. 8,700,286B2 is not concerned with the problem of noise, and does not provide any details of how to handle noise.

Figure 2:
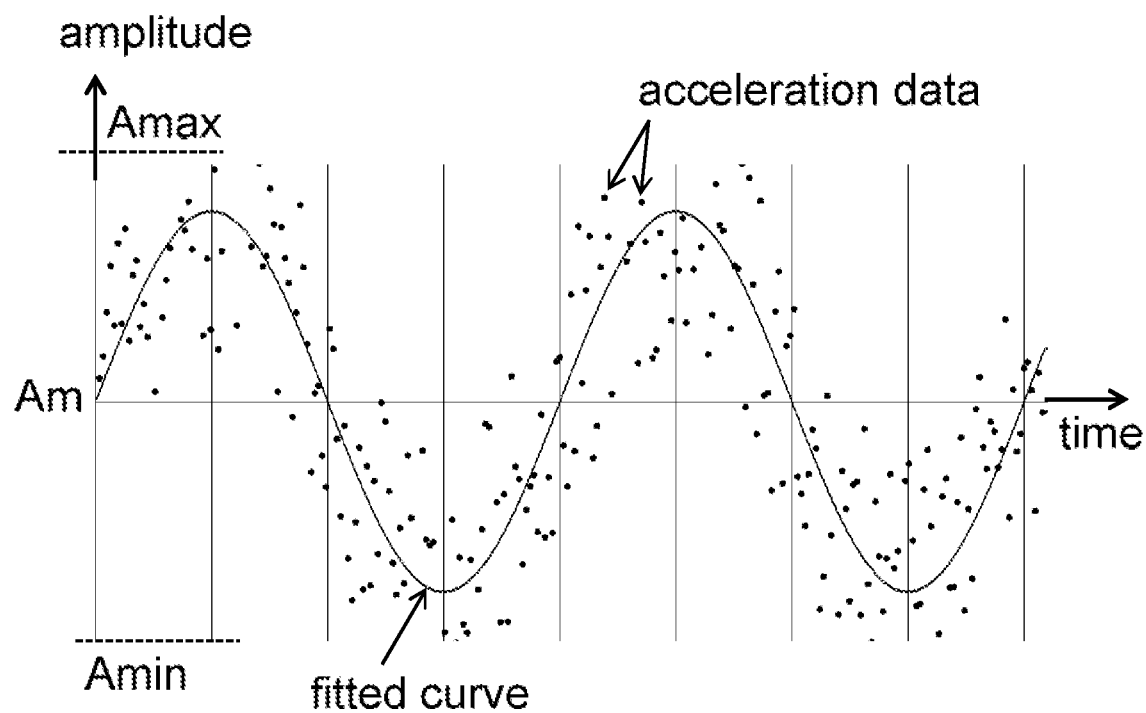
FIG. 2 shows a plurality of "dots" as an example of actual acceleration data versus time, obtained from an acceleration sensor mounted to a wheel, including noise, mainly caused by mechanical vibrations.

In practice however, the data obtained from the acceleration sensor is not as smooth as FIG. 1 seems to suggest, but often suffers severely from noise due to mechanical vibrations, as illustrated in FIG. 2.

FIG. 2 shows a plurality of "dots" representing actual acceleration data obtained from an acceleration sensor embedded in a sensor device according to the present invention, mounted to a wheel. The values of the acceleration data can be seen as a sine wave (similar to the "ideal sine wave" shown in FIG. 1) but with superimposed noise, mainly due to mechanical vibrations of the rotating wheel. This noise presents itself as high-frequency random noise.

Each of the dots corresponds to an actual measurement of the acceleration sensor inside the sensor device. Clearly, the more samples are taken per period, the more accurate the angular position can be determined, but also the more power is required for measuring and processing the data. The skilled person can easily find a suitable sampling frequency as a function of the car speed or as a function of the angular speed of the wheel. In embodiments of the present invention, preferably 16 to 100 samples are taken per period, preferably from 20 to 80 samples per period, for example about 30 samples/period, or about 40 samples/period, or about 50 samples/period, or about 60 samples/period, or about 70 samples/period, e.g. 16 or 32 or 48 or 64 or 80 or 96 samples per period.

In practical implementations, a control unit, e.g. a microprocessor of the sensor device periodically wakes up, takes a sample from the acceleration sensor, processes the acceleration sample to remove noise, performs some calculations to verify whether the wheel is in the predefined angular position range, and if so, takes for example a sample from another sensor, e.g. a pressure sensor, transmits the pressure value, optionally reprograms a wake-up timer to wake up some time later, and goes to sleep again, in order to save power. "Low-power modes" and "sleep modes" are well known in the art, and hence need not be explained in more detail here.

It is technically possible to periodically adjust the wake-up period (and thus also the sampling frequency "fs" or sampling period "Ts") such that a "relatively constant" number of samples is taken per period, for example about 48. With "relatively constant" is meant a predetermined number of samples +/− for example 20% to take into account acceleration or deceleration of the car. After each wheel rotation, the period Ts of the preceding rotation can be determined (e.g. based on a local timer), and the estimated period Ts for the next wheel rotation can be determined, and also the wake-up period can be determined, e.g. as Ts/48 in the example, but the invention is not limited thereto.

However, another approach is preferred, wherein the sampling frequency fs is selected from a limited set of predefined sampling frequencies, for example from a set of only three predefined sampling frequencies.

In an exemplary embodiment of a sensor device according to the present invention, three sample frequencies were chosen:

fs1=about 125 Hz (Ts=8 ms) if the angular speed $\omega$ of the wheel lies in the range from 2.0 to 4.0 revolutions/second (typically corresponding to a car speed of about 10 km/h and 40 km/h), fs2=about 200 Hz (Ts=5 ms) if the angular speed $\omega$ of the wheel lies in the range from 4.0 to 9.0 revolutions/second (typically corresponding to a car speed of about 40 km/h and 70 km/h), fs3=about 400 Hz (Ts=2.5 ms) if the angular speed $\omega$ of the wheel is higher than 9.0 revolutions/second (typically corresponding to a car speed higher than 70 km/h), but of course the present invention is not limited to only three sample frequencies and to these specific values or ranges, and another number of sampling frequencies and other ranges can be used as well. Preferably however, at most 10 or at most 8 or at most 6 or at most 4 different sampling frequencies or at most 3 different sampling frequencies are used.

Also shown in FIG. 2 is a fitted "sinusoidal curve", which is added for illustrative purposes, to explain the principles of the present invention. Importantly, this curve is not calculated by the resource constraint and power constraint processor inside the sensor device itself, but is calculated off-line using "curve fitting" techniques performed on a separate computer. Curve-fitting techniques are well known in the art, but they are also very computationally intensive, and therefore cannot be performed by the processor inside the sensor device within the given constraints (memory, power, time, . . . ).

Thus the inventors were confronted with the specific problem of finding a method or an algorithm capable of determining a moment in time at which the wheel assumes a predefined angular position, within a predefined tolerance margin of +/−20°, or within a tolerance margin of +/−15°, or within a tolerance margin of +/−10°, in order to obtain reliable auto-location, starting from the noisy acceleration data, and not having the time or resources (in particular processing power and memory) or power to calculate the smooth sinusoidal curve. Trying to find a solution for the problem, the inventors came to the idea of using a particular kind of digital filter illustrated in FIG. 3, followed by a decision circuit 301.

FIG. 3 is a block-diagram illustrating an algorithm or a method for determining whether or not the wheel is in the predefined angular position (within a predefined tolerance margin). As explained above, the acceleration sensor is sampled at a certain sampling frequency (e.g. a sample frequency selected out of three predefined sample frequencies, depending on the angular wheel speed). Each sample $X_i$ is provided as input to the functional block 300, and the block 300 provides a binary trigger signal to indicate whether a data packet (e.g. containing pressure data) is to be transmitted or not.

According to an important aspect of the present invention, the (noisy) acceleration data $X_i$ is filtered using a plurality of at least two, e.g. at least three, e.g. at least four, e.g. at least five, e.g. at least six low pass digital filters, connected in series. Each of these filters is an Exponential Moving Average Filter, abbreviated herein as "EMA".

Processing the data in EMA1, EMA2, etc. comprises calculating one or more of the following set of formulas, or equivalent formulas:

$$EMA[1]_i = \frac{1}{N}x_i + \frac{N-1}{N}EMA[1]_{i-1}, \quad [1]$$

and:

$$EMA[M]_i = \frac{1}{N}EMA[M-1]_i + \frac{N-1}{N}EMA[M]_{i-1}, \quad [2]$$

for M=2 for EMA2, M=3 for EMA3, etc.

Thus, for each new sample, only two multiplications and one addition are required, as can be understood from formulas [1] and [2]. Preferably the values used are floating point values, but that is not absolutely required.

The inventors surprisingly found that, if "N" is chosen proportional to the period "T" of one complete wheel rotation (of 360°), for example as N=T.fs/6 or N=T.fs/7 or N=T.fs/8 or N=T.fs/9 or N=T.fs/10 or N=T.fs/11 or N=T.fs/12, or in general as N=T.fs/C where C is a predefined constant value in the range from about 5.0 to about 12.0, and fs is the sampling frequency, (thus T.fs is the number of samples per 360° wheel rotation), that each EMA effectively low-pass filters the noisy data, but even more importantly, provides a substantially constant phase shift.

If was moreover found that this phase shift is largely insensitive to the number of samples per period (and thus to the sampling frequency), especially if the number of samples per period is at least 20 or at least 30 or at least 40 or at least 50 or at least 60 or at least 70 or at least 80.

More specifically, they surprisingly found that if the value of N is chosen equal to T.fs/(2$\pi$) and the number of samples per period is chosen sufficiently high (e.g. at least 40 per period), that the EMA results in a constant phase shift equal to about 45° (see FIG. 12b), and that if the value of N is chosen equal to T.fs/(3$\pi$) and the number of samples per period is chosen sufficiently high (e.g. at least 40), that the EMA results in a substantially constant phase shift of about 30° (see FIG. 12d).

It is noted that the term "Exponential Moving Average" is a well-known term in the financial world, where it is used for tracking the value of shares in the stock market, but as far as is known to the inventors, it is not known that EMA-functions, when applied to the noisy data of FIG. 2, which can be considered as the superposition of a sine function with period T and random noise, and when the value of N is chosen as N=T.fs/C, C being a predefined constant in the range from about 5.0 to about 12.0, and when sampled with 20 to 100 samples per period, for example at least 30 or at least 40 samples per period, that such an EMA-function operates as a low-pass filter with a substantially constant phase shift.

As the phase shift of each individual EMA-function is constant, so is the total phase shift of a series connection of at least two EMA's. This is true if EMA1, EMA2 etc. all use the same value the value of N, for example N=T.fs/(2$\pi$), but is still true if some or all of the EMA's use different values of N, for example the value N of EMA1 being set at T.fs/(2$\pi$), and the value N of EMA2 being set at T.fs/(3$\pi$), resulting in a total phase shift of about 75°. However, in order to reduce the number of calculations, it is preferred that the EMA's use the same value of N.

As the vehicle typically does not drive at a constant speed, the value of T is regularly recalculated, for example once or twice every 360° wheel rotation, and by adjusting the value(s) of N accordingly.

In case all EMA's use the same value of N (which is not absolutely required, but preferred in some embodiments), it can be understood that the weighting factors (1/N) and (N−1)/N also need to be recalculated only once per 360° wheel rotation.

Furthermore, it is very advantageous that each EMA-filter only requires a very small memory, because only a very small number of numerical values needs to be stored and updated, in contrast to a classical (simple) Moving Average function, referred to herein as "SMA", typically having a window size of at least 40 samples, thus requiring a memory size of at least 40 values.

Last but not least, it was found that each EMA adequately filters the noise.

So far, only the EMA-blocks were described. In the following, it will be explained how these values can be used to determine a moment in time at which the wheel is in a predefined angular position (within a given tolerance margin). That is the function of the decision circuit 301, which will be explained first for the specific example of FIG. 3 having six EMA's connected in series, each using the same value of N=T.fs/(2$\pi$), each causing a constant phase shift of about 45°. Thus, the samples at the output of EMA1 are 45° phase shifted with respect to the original data, the samples at the output of EMA2 are 45° phase shifted with respect to the output of EMA1 and 2×45°=90° phase shifted with respect to the original data, etc. This is visualized in FIG. 4.

Figure 4:
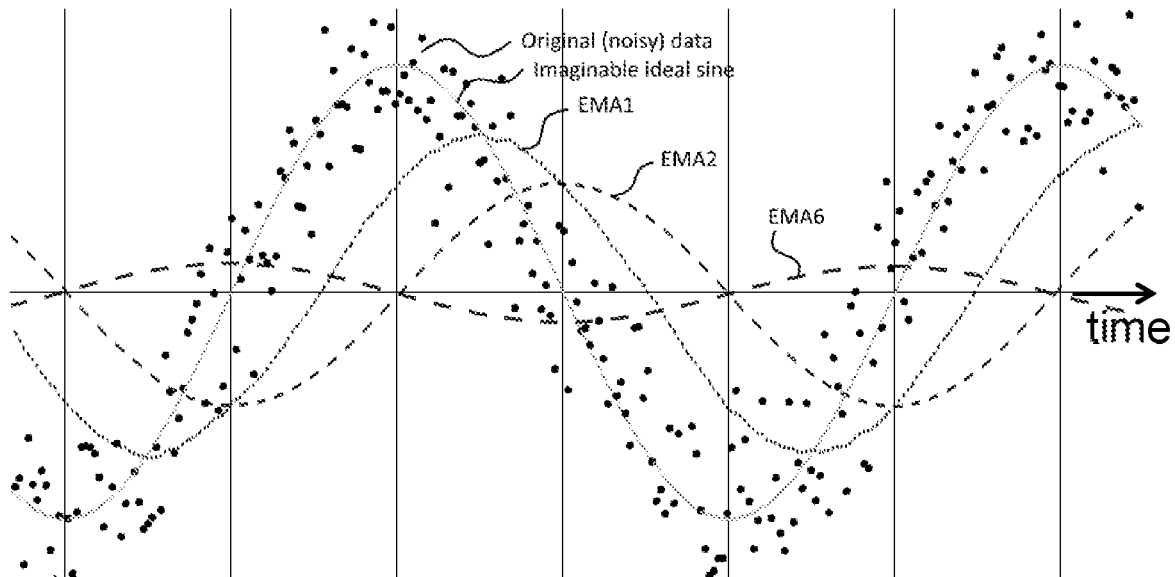
FIG. 4 shows a plurality of "dots" as an example of noisy acceleration data obtained from an accelerometer, and shows four sinusoidal curves, the first curve "Original" representing a sine wave fitted to the original (noisy) data, the other curves representing EMA1, EMA2, EMA6 obtained by using the filter of FIG. 3 when using a particular weighting factor $N=T.fs/(2\pi)$, where T is the time period corresponding to a 360° wheel rotation, fs is the sampling frequency, and (T.fs) is the number of samples per 360° wheel rotation.

DC-Component:

Before explaining FIG. 4, it is noted that the acceleration data of FIG. 1 are measured as centrifugal or centripetal acceleration data. This data contains both a DC-component (in the example of FIG. 1 equal to about 46.5), from which the angular speed of the wheel can be extracted, and a +/−1 g ripple signal. Such acceleration data Xi can be input to the EMA's directly.

Preferably however, the DC-value is subtracted from the acceleration data before entering EMA1. The DC-value can for example be calculated as the average between the two most recent extremes (i.e. the last local maximum and the last local minimum) of the output of EMA1 or EMA2 or any other EMA. It was found that, this DC-value does not change significantly between successive periods, and the exact determination of this average is not critical.

Rather than using the DC +/−1 g ripple signal from a centrifugal acceleration sensor, it is also possible to use the +/−1 g ripple signal from a tangential acceleration sensor (if available). In preferred embodiments of the present invention, both a centrifugal acceleration and a tangential acceleration can be measured. The centrifugal acceleration can be used to extract the angular wheel speed (in manners known in the art), while the tangential acceleration can be used to extra the +/−1 ripple signal without the DC-component that is dependent on speed.

It was found that the formulas [1] and [2] work in all three cases:

i) for centrifugal force, where the non-zero average (or DC-value) is not subtracted, but this algorithm typically converges slightly slower;

ii) for centrifugal force, where the non-zero average (or DC-value) is subtracted before entering EMA1, iii) for tangential force, which provides the same results as ii) but does not require determination of the local maximum and local minimum, and the calculation of the average, and the subtraction of that average from the sample values. The latter embodiment requires less processing time and less processing power, and thus is more power efficient.

FIG. 4 shows the (noisy) acceleration data of FIG. 2, and the data series provided by the six EMA filters of FIG. 3, when using a particular weighting factor $N=T.fs/(2\pi)$, where T is the time of one full period (i.e. 360° rotation) of the wheel, fs is the sampling frequency, and (T.fs) is the number of samples during one 360° rotation.

As described above, it was found that for this particular value of N, and a sufficiently high number of samples per period (e.g. at least 20 or at least 30 or at least 40), that the EMA1-output is 45° phase shifted with respect to the (ideal noise-free) original data, EMA2 is 2×45°=90° phase shifted, etc., and EMA6 is 6×45°=270° phase shifted with respect to the original data.

It follows that the local maxima of the original data substantially coincide with zero crossings of EMA2, and that the local maxima of EMA2 substantially coincide with zero-crossings of the original data, and that zero-crossings of EMA2 substantially coincide with local minima of the original data.

It follows also that crossings of EMA2 and EMA6 substantially coincide with local maxima and local minima of the original data.

The inventors came to the idea of exploiting these observations for determining the moments at which a data packet is to be transmitted. In particular, any one of the following moments in time can be used as the moment of transmission (see table 1):

TABLE 1

Figure 5:
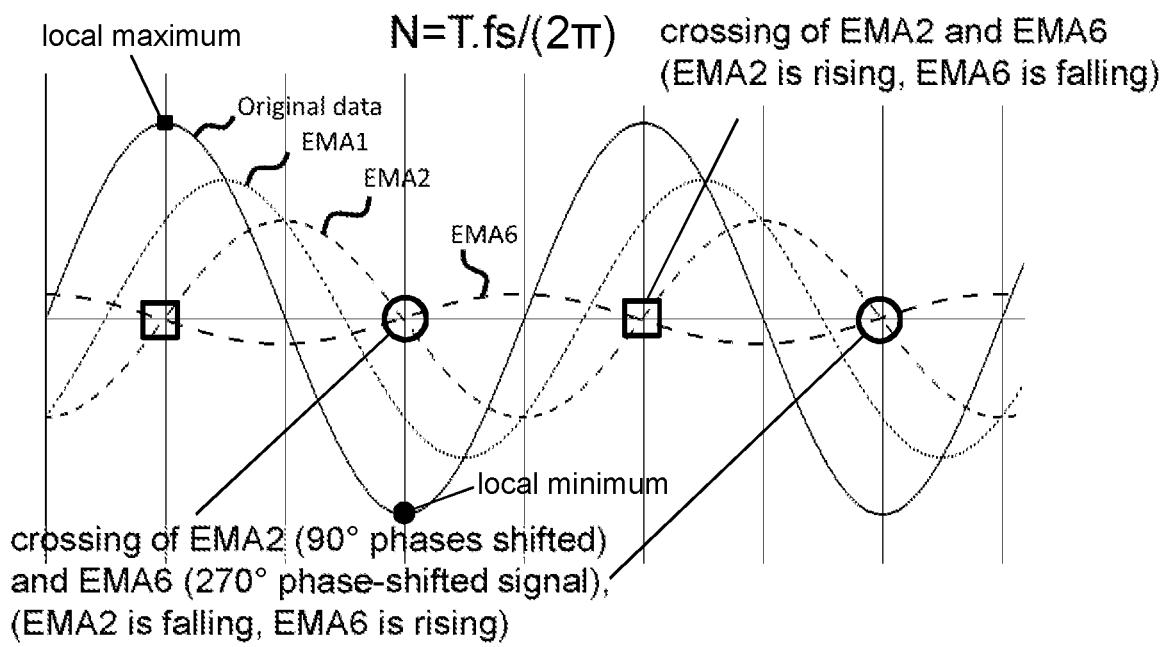
FIG. 5 shows the curves of FIG. 4, with an indication of the crossings of EMA2 and EMA6, as can be used in some embodiments of the present invention. It can be seen that the crossings of EMA2 and EMA6 substantially coincide with the maxima and minima of the fitted curve representing the original data without noise.

| criterion | moments in time at which |
|---|---|
| 1 | EMA1 reaches a local minimum |
| 2 | EMA1 reaches a local maximum |
| 3 | EMA1 reaches a "local zero crossing" and EMA1 is decreasing (falling edge) |
| 4 | EMA1 reaches a "local zero crossing" and EMA1 is increasing (rising edge) |
| 5 | EMA2 reaches a local minimum |
| 6 | EMA2 reaches a local maximum |
| 7 | EMA2 reaches a "local zero crossing" and EMA2 is decreasing (falling edge) |
| 8 | EMA2 reaches a "local zero crossing" and EMA2 is increasing (rising edge) |
| 9 | EMA1 crosses EMA5, and EMA1 is decreasing (falling edge) |
| 10 | EMA1 crosses EMA5, and EMA1 is increasing (rising edge) |
| 11 | EMA2 crosses EMA6, and EMA2 is decreasing (falling edge), these crossings are indicated in FIG. 5 by means of small circles |
| 12 | EMA2 crosses EMA6, and EMA2 is increasing (rising edge), these crossings are indicated in FIG. 5 by means of small squares |

Any one of these criteria can be used, but of course, in order to always transmit at substantially the same angle (within some tolerance margin), the different criteria should not be mixed. (but see also further, where it will be explained that the invention is not limited to the criteria of Table 1).

Although in principle any one of these criteria can be used, the skilled person may take the following points into account when selecting one of these criteria:
the use of EMA1 data may provide more jitter than the use of EMA2 or EMA3 data, because EMA1 data is not heavily filtered, EMA2 data is more filtered, etc. (thus EMA1 signals may have more noise), the amplitude of EMA6 data is smaller than the amplitude of EMA5 data, etc. (thus EMA6 data may have less significant bits),
although in FIG. 5 the crossings of EMA2 and EMA6 coincide with the zero-crossings of EMA2, in practice using crossings of EMA2 and EMA6 may be more accurate, because the slopes of EMA2 and EMA6 have opposite sign, hence the moment of crossing is slightly less sensitive to noise, and thus more accurate, but of course in order to be able to use EMA6, also EMA3, EMA4 and EMA5 need to be calculated, which requires more computations.

The skilled person may also take other considerations into account.

It is an advantage of choosing any of these moments as the moment of transmission, that they have a constant phase shift relative to the original data, irrespective of the wheel speed (provided that the value of T and thus N is regularly adjusted, as will be described further), and provided that the sampling frequency is sufficiently high, as described above.

Evidently, the more samples are taken per period, the more accurate the moment of transmissions can be determined. Or in other words, the sampling frequency fs has an influence on the maximum deviation (and thus jitter) on the moment of transmission. For example, if fs=20× the ground frequency of the sine wave, the maximum error in time is 360°/20=about 18° or +/−9° jitter, but if fs=40× the ground frequency of the sine wave, the maximum error in time is 360°/40=only about 9° or +/−4.5°. Thus by choosing the value of fs sufficiently large, any desired accuracy can be approached. But there is a limitation in terms of power budget and processing time. And for practical reasons, it may be desirable to use a fixed sampling frequency (e.g. fs=125 Hz), or a selected one out of three predefined sampling frequencies.

In one embodiment, the crossings of falling edges of EMA2 and rising edges of EMA6 are used to define the moments of transmission. It can be seen in FIG. 5 that the moments at which the falling edge of EMA2 crosses EMA6, corresponds to the moments in time at which the original data (but without noise) reaches a local maximum, and that the moments at which the rising edge of EMA2 crosses EMA6 corresponds to the moments in time at which the original data (but without noise) reaches a local minimum (but see also further).

Figure 6:
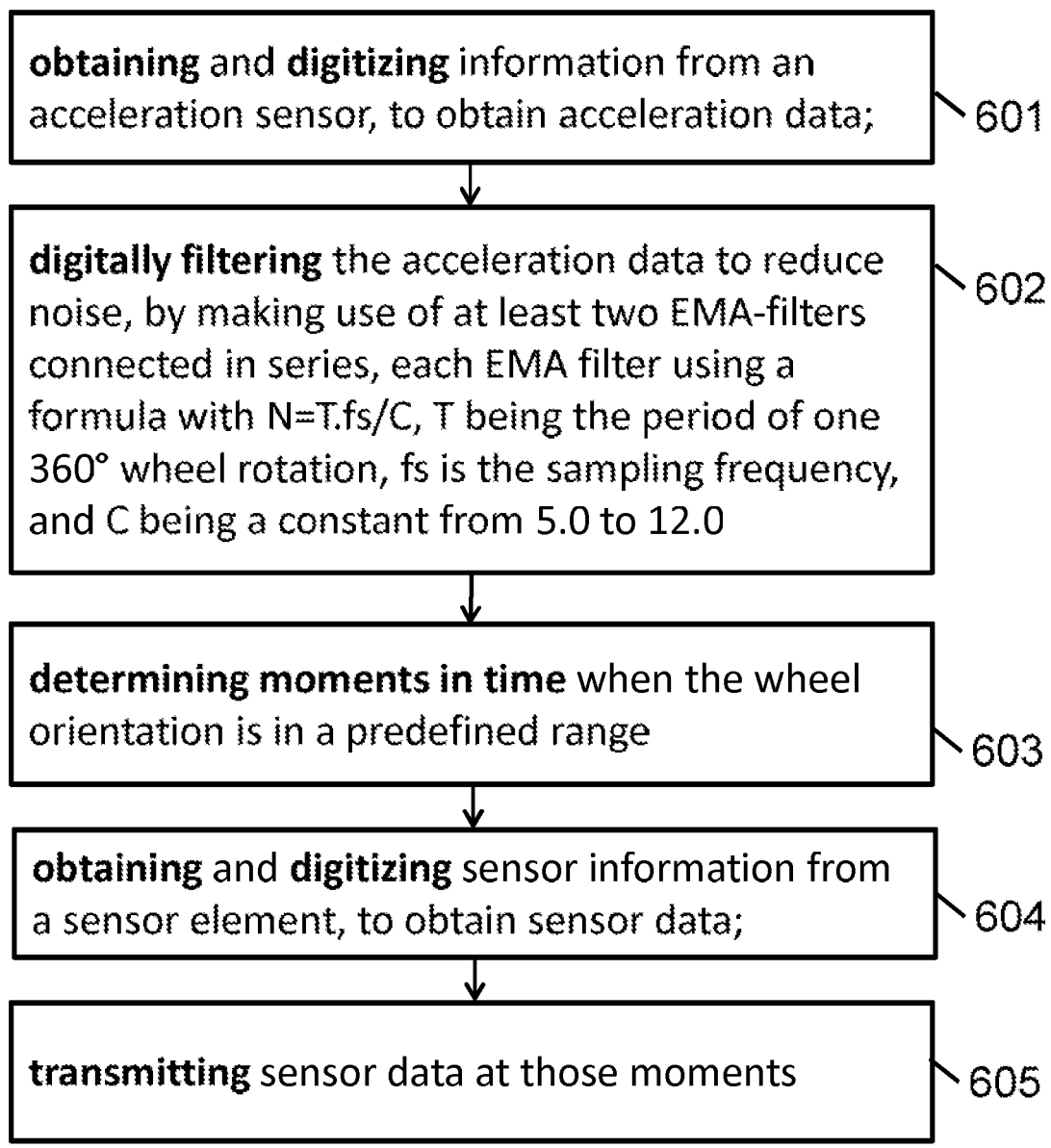
FIG. 6 shows a high-level flowchart of methods according to the present invention.
Figure 9:
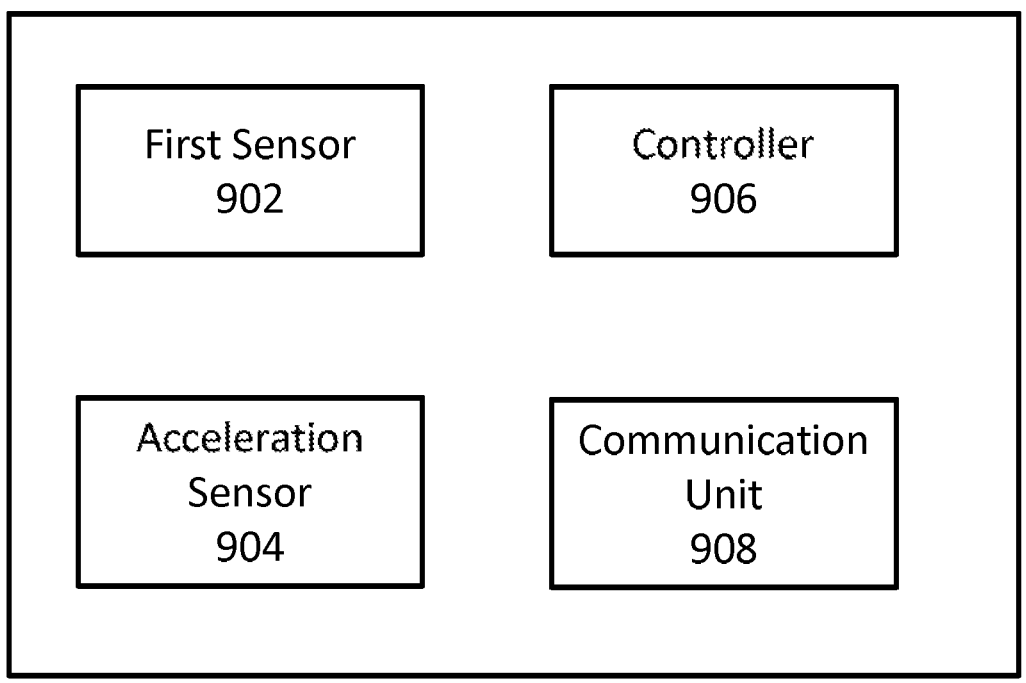
FIG. 9 shows a high level block diagram of a sensor device according to an embodiment of the present invention. The first sensor can for example be a pressure sensor or a temperature sensor.

FIG. 6 shows a high-level flowchart of methods according to the present invention, as can be performed by a sensor device such as the one shown in FIG. 9. The sensor element 902 shown in FIG. 9 is a pressure sensor, but the present invention is not limited thereto, and the sensor element could be any other type of sensor, e.g. a temperature sensor. The method 600 comprises the steps of:
obtaining and digitizing 601 information from an acceleration sensor, to obtain acceleration data;
digitally filtering 602 the acceleration data in a controller 906, 1010 to reduce noise, by making use of at least two EMA-filters connected in series, each EMA filter using a formula (see formula [1] and formula [2] above) with N=T.fs/C, T being the period of one 360° wheel rotation, and C being a predefined constant from 5.0 to 12.0, and fs the sampling frequency;
determining 603 moments in time when the wheel orientation is in a predefined range;
obtaining and digitizing 604 sensor information from a sensor element, to obtain sensor data;
transmitting 605 the sensor data to a receiver at those moments in time at which the wheel is in a predefined angular position (within a predefined tolerance margin).

Figure 7:
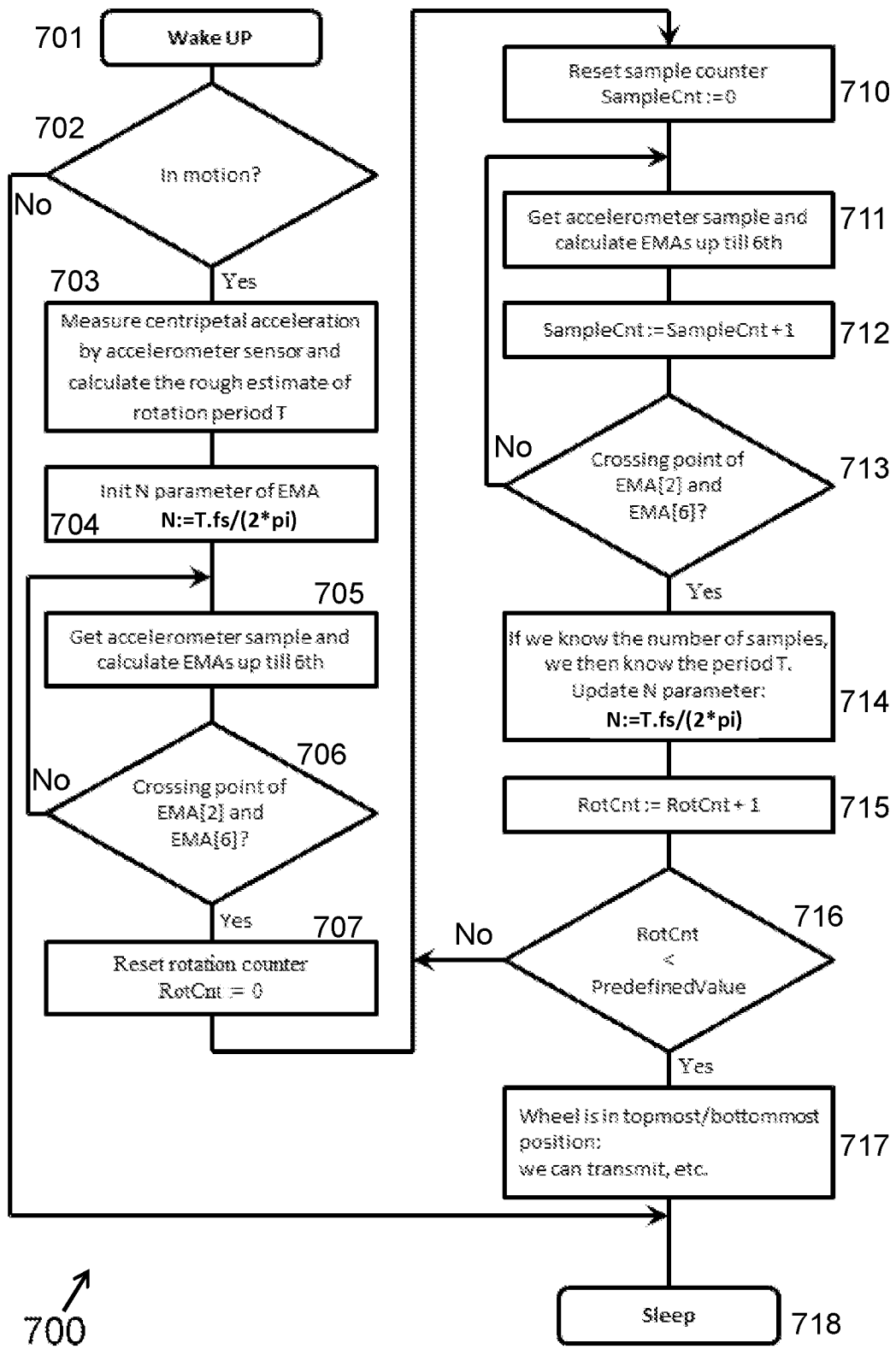
FIG. 7 is a more detailed example of a particular embodiment of a method according to the present invention.

FIG. 7 is a more detailed example of a particular embodiment of a method according to an embodiment of the present invention, where the criterion for determining the moments in time of transmission is chosen as the crossing between rising edges of EMA2 and falling edges of EMA6, or vice versa. It is even possible to transmit data packets at both of the crossings of EMA2 and EMA6 (both rising edges and falling edges of EMA2). This can for example be used when driving at low speed.

Most steps are self-explanatory, only some steps will be explained.

In step 702 it is tested whether the wheel is moving or not. Obvious, when the car is standing still, it does not make sense to measure and/or to transmit data, thus power can be saved.

In step 703 the period T is initialized with a very rough estimate. This can lead to a wrong calculation of the phase, but the algorithm with recalculate the period T more precisely thereafter. This is depicted in FIG. 8, where the rough period estimate T1 has 20% error.

In step 701 and step 718 mean that the processor goes to sleep mode between two measurements. Controllers or processor, for example microcontrollers with a sleep mode or low-power mode functionality are well known in the art, and therefore need not be explained in more detail herein. It suffices to know that in low power mode, typically a wake-up-timer is still ticking at a reduced clock frequency, typically based on an RC-oscillator frequency (not explicitly shown in FIG. 9 or FIG. 10).

In step 717, of the particular example of FIG. 7, a transmission takes place. As described above, it does not really matter in which position the transmission takes place, as long as it happens at a constant angular wheel position for each auto-location action.

Figure 8:
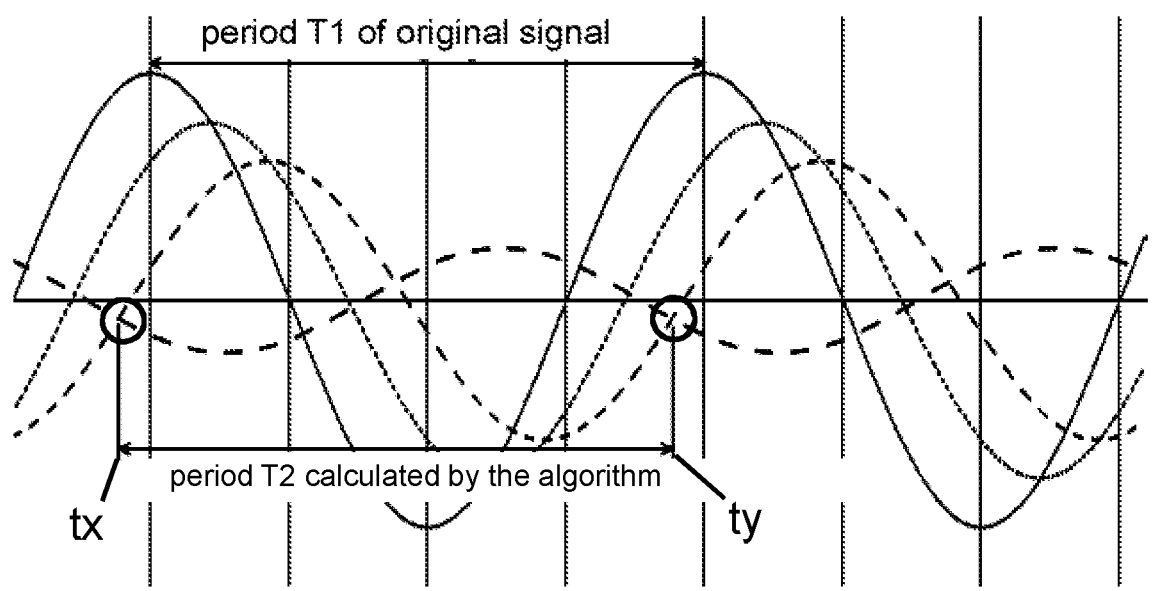
FIG. 8 illustrates an aspect of methods according to the present invention, and illustrates in particular how the value of the period T can be initialised, and how the value of the period T can be updated.

FIG. 8 illustrates an aspect of methods according to the present invention in particular how the value of the period T can be initialised to the value T1, for example based on centrifugal force (in manners known per se in the art), but more importantly, how the value of the period T is updated. In the example shown, the value of T is considered constant from the start of a rising edge of EMA2 crossing EMA6, until the next rising edge of EMA2 crossing EMA6. The value of T can be determined for example by using a timer 1017 (see FIG. 10) to capture the timestamps of these events, and to subtract these timestamps.

FIG. 9 shows a high level block diagram of a sensor device according to an embodiment of the present invention. While at first sight the hardware blocks may seem be the same as prior art devices, the controller 906 is adapted for performing methods according to the present invention, for example the method shown in FIG. 6 or FIG. 7, using at least two EMA's connected in series, as illustrated in FIG. 3.

Figure 10:
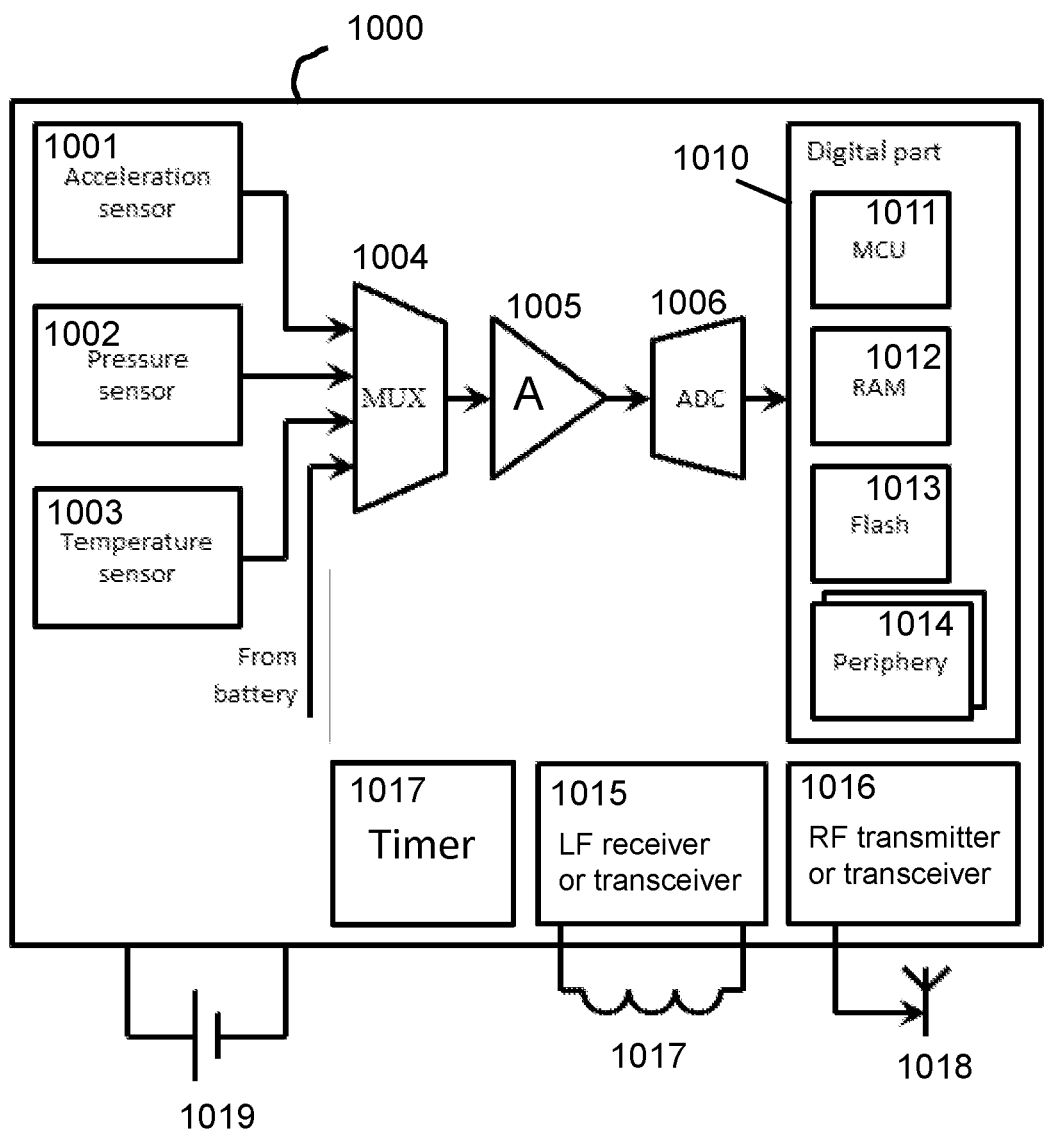
FIG. 10 shows a more detailed example of a particular embodiment of the sensor device according to the present invention.

FIG. 10 shows a more detailed hardware block-diagram as an example of a particular embodiment of the sensor device 1000 according to the present invention.

The sensor device 1000 has both a pressure sensor 1002 and a temperature sensor 1003, but that is not absolutely required. Variants may comprise only a pressure sensor, or only a temperature, or none of these but another kind of sensor.

The device 1000 has a multiplexer 1004, followed by an amplifier 1005 followed by a single Analog-to-Digital Convertor 1006, but that is not absolutely required, and the different sensors may have their own amplifier and/or analogue-to-digital convertor.

The device 1000 typically has a microcontroller or an MCU 1011, connected to or comprising volatile memory such as RAM 1012, and connected to or comprising non-volatile memory, such as for example EEPROM or Flash 1013, and optionally other periphery 1014.

The device 1000 may optionally comprise an LF receiver 1015 connected to a coil 1017, for example for receiving data (e.g. a unique ID) to be programmed in the device, and/or for receiving electrical power in order not to discharge the battery during initialization. However, an LF receiver is not absolutely required for the present invention to work.

The RF part 1016 is connected to an RF antenna 1018 for transmitting the data packets.

Preferably not only the MCU but also other modules can be set in low-power mode. For example the device 1000 may comprise one or more switches for selectively powering individual modules, such as for example for selectively powering the RF transmitter.

In a preferred embodiment, the timer 1007 may be adapted for providing a clock signal having a frequency in the range from 4 MHz to 12 MHz, for example a clock frequency of about 8 MHz. This clock frequency can be derived from an RC oscillator, e.g. from a calibrated RC oscillator.

Figure 11:
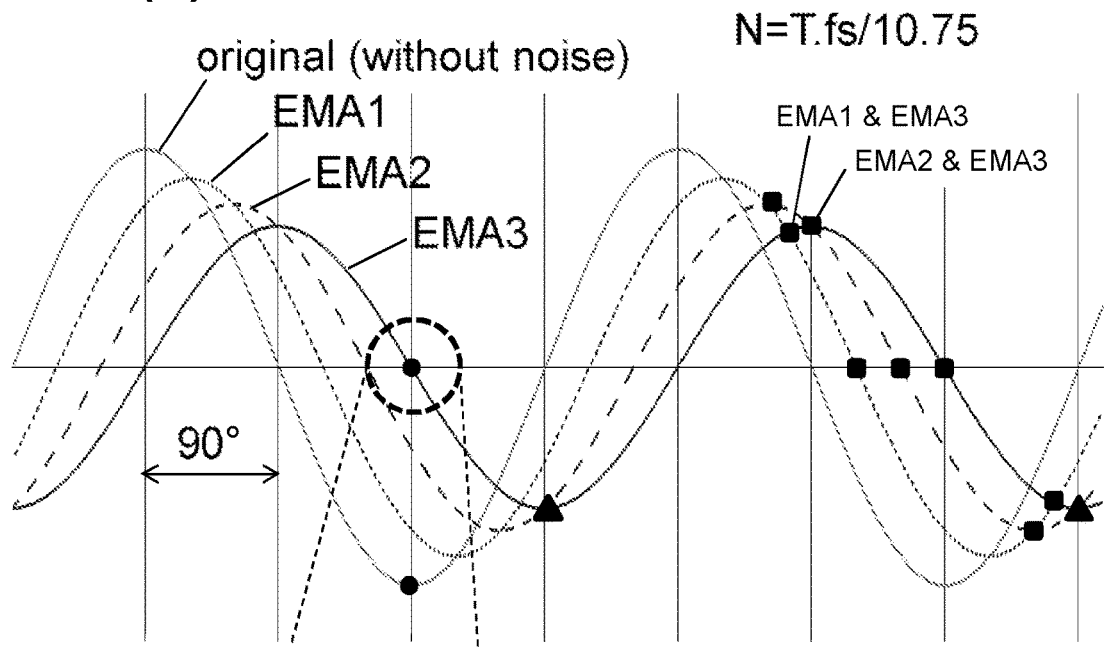
FIGS. 11(a) and 11(b) show a set of curves as can be obtained from the filter structure of FIG. 3, when using a particular weighting factor $N=T.fs/10.75$, where T is the time period corresponding to a 360° wheel rotation, fs is the sampling frequency, and (T.fs) is the number of samples per 360° wheel rotation.
Figure 11:
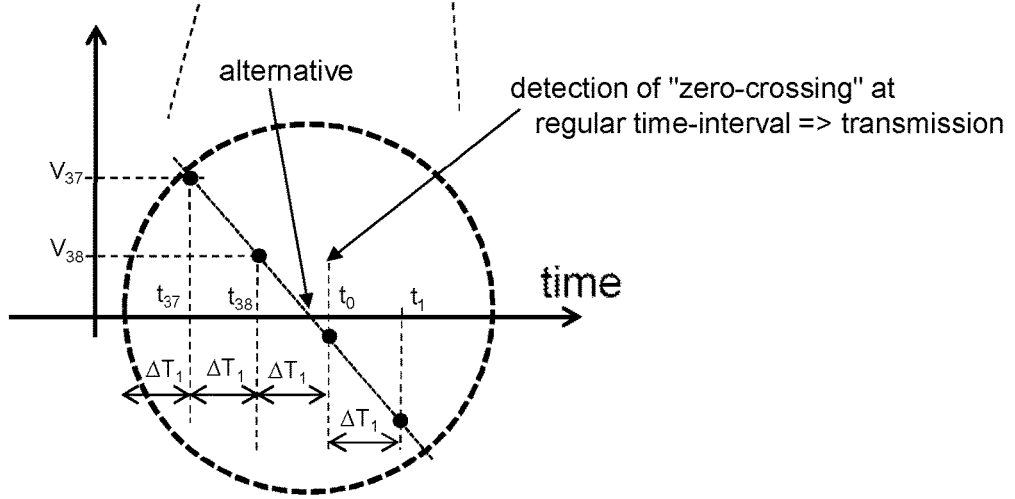

FIGS. 11(a) and 11(b) show a set of curves as can be obtained from a filter structure like the one shown in FIG. 3, but having only three EMA's: EMA1, EMA2 and EMA3. As described above, EMA1 uses a value for N (denoted as N1) proportional to T, for example equal to T/C1, where C1 is a predefined constant in the range from 5.0 to 12.0. Likewise, EMA2 uses a value for N (denoted as N2) proportional to T, for example equal to T/C2, where C2 is a predefined constant in the range from 5.0 to 12.0. It is noted that the value of C1 and C2 may be the same, but that is not absolutely required. Finally, EMA3 uses a value for N (denoted as N3) proportional to T, for example equal to T/C3, where C3 is a predefined constant in the range from 5.0 to 12.0. C3 may be the same as C1, or may be the same as C2, or may be different from both C1 and C2.

In a particular embodiment, each of EMA1, EMA2 and EMA3 use the same value for C, namely C=10.75, thus N=T.fs/(10.75), where T is the time period corresponding to a 360° wheel rotation. It was found that (for a sufficiently high number of samples period, e.g. at least 40 samples/period) that the phase shift caused by these EMA's is about 30° each, thus EMA3 is shifted by about 3×30°=90° with respect to the original data. Hence, the local minima of the original sinusoidal data (which is not available because of superimposed noise) coincide with "zero-crossings" of EMA3, but the latter is substantially noise-free, and thus the zero-crossings can be determined quite accurately.

In some embodiments of the present invention, the acceleration sensor is sampled, and filtered at a predefined sampling frequency (e.g. at 400 Hz), or at a sampling frequency selected from a limited set of sampling frequencies (e.g. at 125 Hz or at 250 Hz or at 400 Hz, depending on the angular speed of the wheel), as shown in FIG. 11(b) where the measurements are taken periodically at time intervals equal to $\Delta T_1$.

The "moment of zero-crossing" can be determined in different ways. The simplest way is illustrated in FIG. 11(b), where the zero-crossing is simply detected at one of the intervals where the EMA3-value has changed sign (in the example from positive to negative). If the number of samples per period is sufficiently high, for example about 40 per period (but the actual number follows from the sampling frequency and the actual wheel rotation speed), this will cause some jitter on the moments of transmission. If so desired, this jitter can be reduced by choosing more samples per period, thus by choosing a higher sampling frequency.

In an alternative embodiment, the actual time of the zero-crossing is predicted by linear extrapolation of the data (V37, T37) and (V38, T38), and a special timer-interrupt is used to wake-up the processor for transmitting the data packet at this predicted time. In this way, the jitter can be further reduced.

By always transmitting a data packet at, or shortly after the zero crossings of EMA3, the data packets are always transmitted when the wheel is in substantially the same angular position. This is true even if the absolute value of the period T changes (e.g. when the car slowly accelerates), because the EMA-filters take this variation of T into account (see formula [1] and [2] above, where the value of N is proportional to T). Furthermore, the moments of zero-crossings of EMA3 are highly robust against jitter on the input signal Xi, because EMA3 is already filtered multiple times.

It is an advantage of the algorithm or method illustrated in FIG. 11(a) (having only three EMA's) as compared to the method of FIG. 3 (having six EMA's) that it requires less memory and less computations, and thus consumes slightly less power.

While in the examples above, it was suggested to transmit only at times where the (original imaginary noise-free) acceleration data reaches a local maximum or a local minimum, but that is not absolute required, and the transmission can actually be performed at any constant angle (or phase shift). Thus the conditions of Table 1 are good examples, but other conditions can be used as well.

Taking into account that the original (imaginary noise-free) sine wave always has the same amplitude of +/−1 g, this implies that in fact crossings between any two EMA's can be used as a suitable moment of transmission. For example, any of the moments corresponding to the black squares shown in FIG. 11(a) can be used as a moment of transmission point, but of course in subsequent periods, the corresponding crossing of the same EMA's should be used. Thus, for example, the crossings of rising edges of EMA2 and EMA3 in FIG. 11(a), indicated by black triangles will also form a suitable set of transmission points.

It will be appreciated that the method will be slightly more robust to noise on the input signal when the slopes of the curves at the moment of intersection are closer to 90°. It is noted in this respect that the intersections of EMA1 and EMA3 are slightly better defined than the intersections of EMA2 and EMA3. On the other hand, EMA2 is better filtered than EMA1, which favours the use of EMA2 over EMA1. The skilled person can easily find a good compromise by doing experiments.

But the present invention is not limited to algorithms or methods or systems with three EMA's (as shown in FIG. 11(a)), and it is also possible to use for example four EMA's, or five EMA's. In case of four EMA's, each of the four EMA's may use the same value for N, but that is not absolutely required, and each or some of the EMA's may use different values for N. As an example only, N1 and N2 may be chosen equal to T.fs/(2π), N2 may be chosen equal to T.fs/8.25 and N2 may be chosen equal to T.fs/10.75. Each of these EMA's will provide a constant phase shift, and the skilled person can easily find a criterion to select suitable moments of transmission, for example at zero-crossings of EMA2 or at zero-crossings of EMA3 or at zero-crossings of EMA4 or at crossings of EMA2 and EMA3 or at crossings of EMA2 and EMA4 or at crossings of EMA3 and EMA4, as discussed above. The higher the EMA-number, the lower its amplitude but the better the filtering. It is usually not preferred to select crossings of an EMA with one of its direct neighbours, because the slopes at the intersection points may be quite similar (e.g. define an angle smaller than 30°). All of these aspects are explained in detail above, and the skilled person can easily perform routine experiments to select an appropriate combination. Finally, it is even possible to transmit at moments in time when one of the curves (for example EMA2) crosses a predefined DC-value different from zero, e.g. when EMA2 crosses the value +0.1 g or when EMA3 crosses −0.125 g, etc.

FIGS. 12(a) to 12(d) show four exemplary sets of curves to illustrate the influence of the number of samples per period, and the influence of the value for N chosen as N=T.fs/C, where C is a predefined constant. In these examples, the "original data" was assumed to be a noise-free sinusoidal curve, to better illustrate the phase shift, and amplitude decrease.

FIG. 12(a) represents EMA1 to EMA4 for N=T.fs/(2π) and 20 samples/period.

FIG. 12(b) represents EMA1 to EMA4 for N=T.fs/(2π) and 40 samples/period.

FIG. 12(c) represents EMA1 to EMA4 for N=T.fs/(3π) and 20 samples/period.

FIG. 12(d) represents EMA1 to EMA4 for N=T.fs/(3π) and 40 samples/period.

As can be seen, the phase shift for each of these cases is constant (independent of the wheel speed).

The phase shift for N=T.fs/(2π) is close to, but slightly less than 45°, thus two EMA's in series provide a phase shift of about 90°, which allows to detect the moment at which a local maximum or a local minimum is reached in EMA(x) by detecting a zero-crossing of EMA(x+2).

The phase shift for N=T.fs/(3π) is close to, but slightly less than 30°, thus three EMA's in series provide a phase shift of about 90°, which allows to detect the moment at which a local maximum or a local minimum is reached in EMA(x) by detecting a zero-crossing of EMA(x+3).

Comparison of FIG. 12(a) and FIG. 12(b) shows that, quite surprisingly, the phase shift of 45° remains largely the same, irrespective of the number of samples per period. In some embodiments of the present invention, this observation is exploited by not having to adjust the sampling frequency each time the period T changes, but it suffices to use only a small number of predefined sample frequencies. But most of all, it implies that the filters can continue to be used even when T gradually increases or decreases. It does not really matter if the number of samples of the previous rotation turns out to be 40 or only 38 at the moment of transmission (see for example FIG. 11(b)). It was found that the phase shift of the filter remains substantially the same, at least for applications where the angular speed of the wheel cannot suddenly change due to limited acceleration of a car or truck or the like.

The invention claimed is:

1. A method of measuring and transmitting a tire characteristic using a sensor device mounted or mountable to a tire of a wheel of a vehicle, the sensor device comprising: at least one sensor element for sensing a characteristic of the tire, an accelerometer, a wireless transmitter or transceiver, and a controller;

the method comprising the steps of:
a) obtaining information from an acceleration sensor at a sampling frequency and digitizing said information, thereby obtaining acceleration data;
b) digitally filtering the acceleration data to reduce noise;
c) determining at least two moments in time at which the wheel is in a constant angular position range;
d) obtaining and digitizing sensor information from at least one other sensor adapted for measuring a characteristic of the tire, thereby obtaining other sensor data;

e) transmitting the other sensor data to a receiver at said moments in time;

wherein:

step b) comprises making use of a plurality of at least two digital filters connected in series, each of the at least two digital filters being an exponential moving average filter having a filter characteristic corresponding to a set of predefined formulas comprising one or more parameters; and step c) comprises:
- selecting said moments in time as the moments at which an output of one of the EMA-filters crosses an output of another EMA filter, or
- selecting said moments in time as the moments at which the output of one of the EMA-filters crosses zero, or crosses a value equal to zero plus a predefined constant offset, the offset being a value in the range from −0.4 g to +0.4 g, or
- selecting said moments in time as the moments at which the output of one of the EMA-filters crosses an average value or crosses a value equal to said average value plus the predefined constant offset, the offset being a value in the range from −0.4 g to +0.4 g;

and wherein the method further comprises step f) of determining the number of samples between said moments in time, and setting each of said parameters to a value proportional to said number of samples.

2. The method of claim 1, wherein the sampling frequency is chosen as a function of an angular speed of the wheel such that the number of samples per wheel rotation is a value in the range from 20 to 100.

3. The method of claim 2, wherein the sampling frequency is chosen as the function of the angular speed of the wheel such that the number of samples per wheel rotation is a value in the range from 40 to 80.

4. The method of claim 1, wherein step f) comprises:
setting the parameter of the first exponential moving average filter to a value equal to said number of samples between said moments in time divided by a predefined first constant in the range from 5.0 to 12.0, and setting the parameter of the second exponential moving average filter to a value equal to said number of samples between said moments in time divided by a predefined second constant in the range from 5.0 to 12.0; or setting the parameter of the first exponential moving average filter to a value equal to said number of samples between said moments in time multiplied by a predefined first constant in the range from 1/12 to 1/5, and setting the parameter of the second exponential moving average filter to a value equal to said number of samples between said moments in time multiplied by a predefined second constant in the range from 1/12 to 1/5.

5. The method according to claim 1, wherein step a) comprises readout of a centrifugal or centripetal acceleration sensor, and
wherein step b) comprises determining the average value, and
wherein step c) comprises selecting said moments in time as the moments at which the output of one of the EMA-filters crosses said average value or crosses the value equal to said average value plus the predefined constant offset, the offset being the value in the range from −0.4 g to +0.4 g.

6. The method according to claim 1, wherein step a) comprises readout of a tangential acceleration sensor, and wherein step c) comprises selecting said moments in time as the moments at which the output of one of the EMA-filters crosses zero, or crosses the value equal to zero plus the predefined constant offset, the offset being the value in the range from −0.4 g to +0.4 g.

7. The method according to claim 1, wherein step c) comprises selecting said moments in time as the moments at which the output of one of the EMA-filters crosses the output of another EMA filter.

8. The method of claim 7, wherein step c) comprises selecting said moments in time as the moments at which an output of a first EMA-filter crosses an output of another EMA filter which is not directly following the first EMA filter.

9. The method of claim 8, comprising six EMA-filters connected in series, and wherein the parameters of all the EMA-filters are set equal to the value T.fs/(2*π), where T is the period of one 360° rotation, and fs is the sampling frequency.

10. The method according to claim 1, wherein step a) comprises obtaining acceleration information in only a single axis, or
wherein step a) comprises obtaining acceleration information in at least two different axes.

11. The method according to claim 1, wherein the sensor device further comprises a sleep mode or lower power mode and a wake-up timer, and
wherein the sensor device comprises a microprocessor adapted for going to sleep mode for at least 80% of the time.

12. The method according to claim 1, wherein the other sensor element is a temperature sensor or a pressure sensor;
or wherein the sensor device comprises both a temperature sensor and a pressure sensor.

13. A method of measuring and transmitting a tire characteristic using a sensor device mounted or mountable to a tire of a wheel of a vehicle, the sensor device comprising: at least one sensor element for sensing a characteristic of the tire, an accelerometer, a wireless transmitter or transceiver, and a controller;

the method comprising the steps of:
a) obtaining information from an acceleration sensor at a sampling frequency and digitizing said information, thereby obtaining acceleration data;
b) digitally filtering the acceleration data to reduce noise;
c) determining at least two moments in time at which the wheel is in a constant angular position range;
d) obtaining and digitizing sensor information from at least one other sensor adapted for measuring a characteristic of the tire, thereby obtaining other sensor data;
e) transmitting the other sensor data to a receiver at said moments in time;

wherein:

step b) comprises making use of a plurality of at least two digital filters connected in series, each of the at least two digital filters being an exponential moving average filter having a filter characteristic corresponding to a set of predefined formulas comprising one or more parameters;

wherein the predefined set of formulas comprising the one or more parameters is the following set of formulas, or an equivalent set of formulas, the formula for the first EMA-filter being:

$$EMA[1]_i = \frac{1}{N1}x_i + \frac{N1-1}{N1}EMA[1]_{i-1},$$

wherein $x_i$, is a sample of the digitized acceleration data, $EMA[1]_i$, is the "i"-th value of the first Exponential Moving Average block, "i" is an index which is incremented by one for each additional data sample, N1 is a floating point number, and the formula for the second EMA-filter being:

$$EMA[2]_i = \frac{1}{N2}EMA[1]_i + \frac{N2-1}{N2}EMA[2]_{i-1},$$

wherein N2 is a floating point number;

wherein the method further comprises step f) of determining the number of samples between said moments in time, and setting each of said parameters to a value proportional to said number of samples; and wherein the parameters N1, N2 are chosen proportional to said number of samples between the two moments in time at which the wheel is in constant angular position range.

14. A sensor device for measuring and transmitting at least one tire characteristic, the sensor device being mountable to a tire of a wheel of a vehicle, and comprising:

an acceleration sensor;

another sensor element for sensing a characteristic of the tire;

a wireless transmitter or transceiver;

a timer;

a controller comprising a memory storing a program configured for causing the controller to perform the method of claim 1.

15. A sensor module comprising:

a sensor device according to claim 14, a battery or energy harvesting means for powering the sensor device.

16. A tire localization system comprising a plurality of sensor devices according to claim 15.

\* \* \* \* \*